United States Patent
Le Quere

(10) Patent No.: US 7,264,281 B2
(45) Date of Patent: Sep. 4, 2007

(54) CONNECTION MEANS FOR HIGH PRESSURE FLUID DUCTS

(75) Inventor: Philippe Le Quere, Betton (FR)

(73) Assignee: Legris SA, Rennes (FR)

( * ) Notice: Subject to any disclaimer, the term of this patent is extended or adjusted under 35 U.S.C. 154(b) by 162 days.

(21) Appl. No.: 10/526,374

(22) PCT Filed: Aug. 28, 2003

(86) PCT No.: PCT/FR03/02598

§ 371 (c)(1),
(2), (4) Date: Mar. 3, 2005

(87) PCT Pub. No.: WO2004/023013

PCT Pub. Date: Mar. 18, 2004

(65) Prior Publication Data

US 2006/0012171 A1  Jan. 19, 2006

(30) Foreign Application Priority Data

Sep. 5, 2002 (FR) .................................. 02 10981

(51) Int. Cl.
    *F16L 37/00* (2006.01)
(52) U.S. Cl. ..................... 285/308; 285/321; 285/277
(58) Field of Classification Search ................ 285/321, 285/308, 276, 277, 307
    See application file for complete search history.

(56) References Cited

U.S. PATENT DOCUMENTS 3,133,755 A * 5/1964 Sciuto, Jr. ................... 285/277
3,177,018 A * 4/1965 Goodwin ..................... 285/277
4,294,473 A * 10/1981 Ekman ......................... 285/50
4,471,978 A * 9/1984 Kramer ....................... 285/321
5,655,796 A   8/1997 Bartholomew

FOREIGN PATENT DOCUMENTS

| DE | 199 32 307 | 1/2001 |   |         |
|----|-----------|--------|---|---------|
| DE | 101 25 499 | 8/2002 |   |         |
| EP | 0 615 089 | 9/1994 |   |         |
| EP | 0 762 036 | 3/1997 |   |         |
| JP | 6147374   | * 5/1994 | ................ | 285/321 |

* cited by examiner

*Primary Examiner*—David Bochna
(74) *Attorney, Agent, or Firm*—Young & Thompson

(57) ABSTRACT

Connection elements include a coupling defining an internal channel having an end segment possessing an insertion opening for insertion of an endpiece and provided with members for retaining the endpiece in leaktight manner therein. The members include an annular axially compressible sealing element that is mounted in the coupling to have one face serving as a bearing surface for a terminal face of the endpiece, and an annularly-shaped retaining element elastically deformable in a radial direction that is received in an inner groove (21) of the end segment to have an inner circumferential portion projecting through an opening of the inner groove so as to be received in an outer groove of the endpiece. The inner groove has a concave frustoconical flank beside the opening of the end segment to form members for shrinking the retaining element, and a convex frustoconical flank on its side remote from the opening.

4 Claims, 3 Drawing Sheets

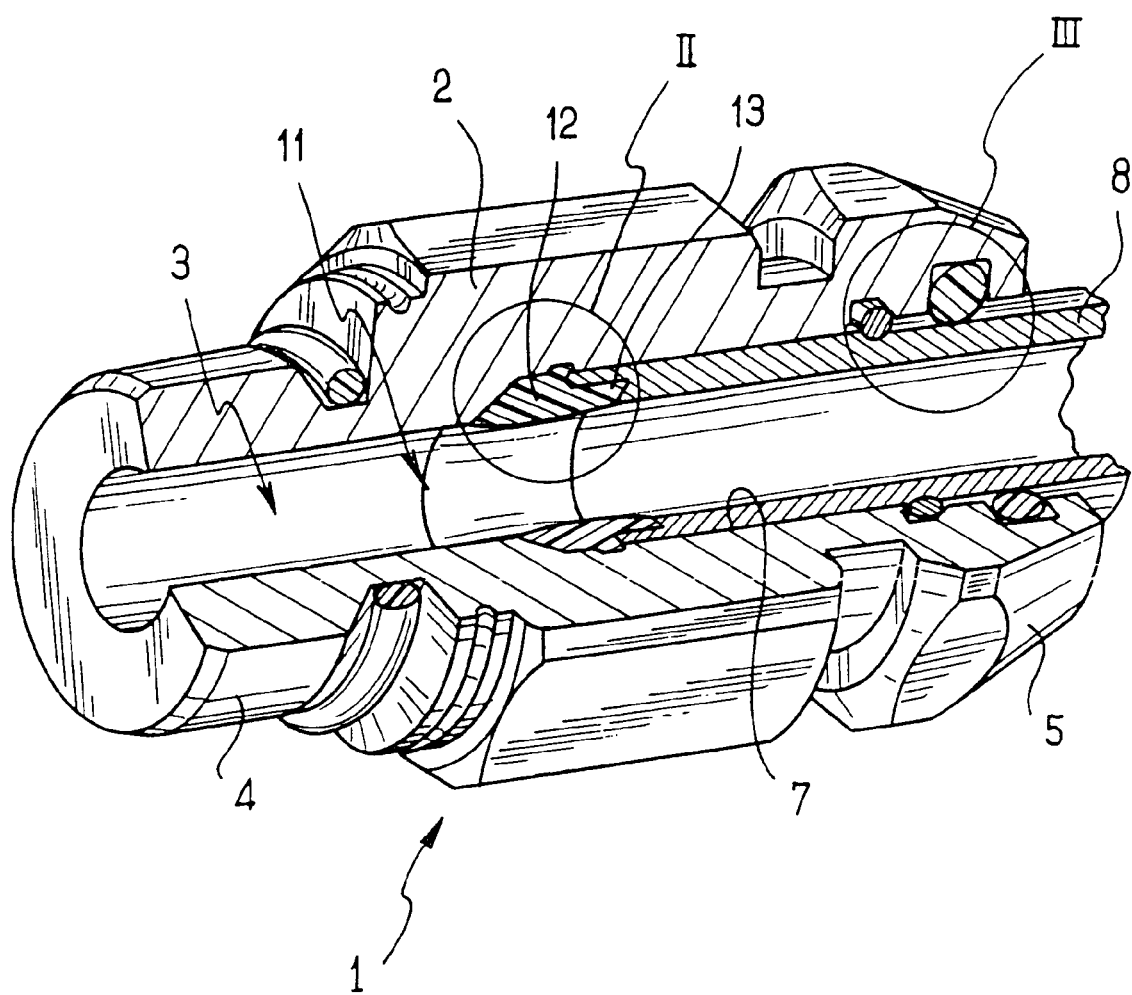
FIG_1

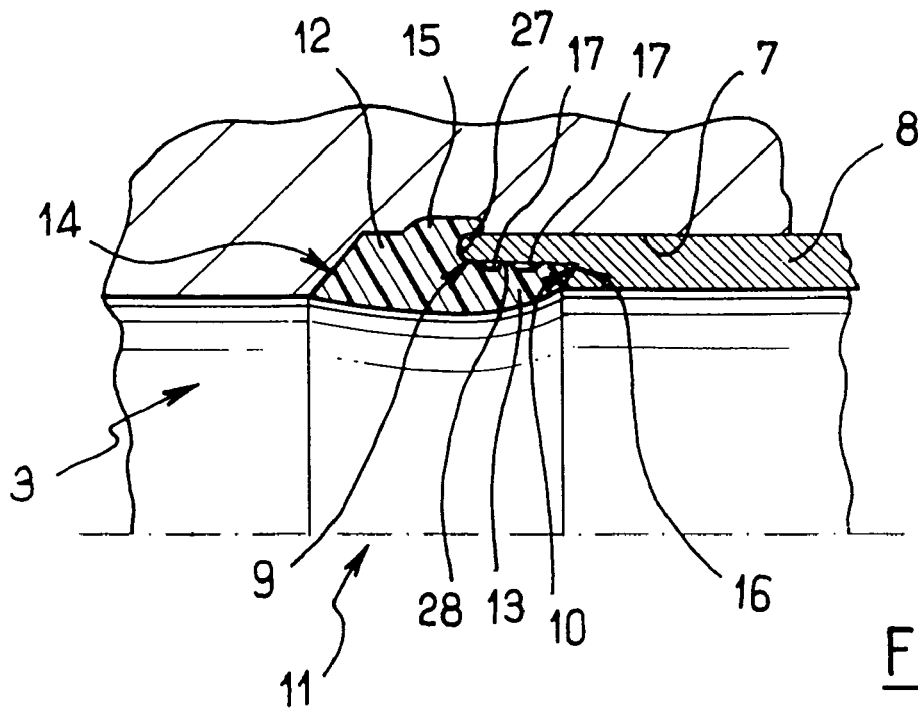
FIG_2
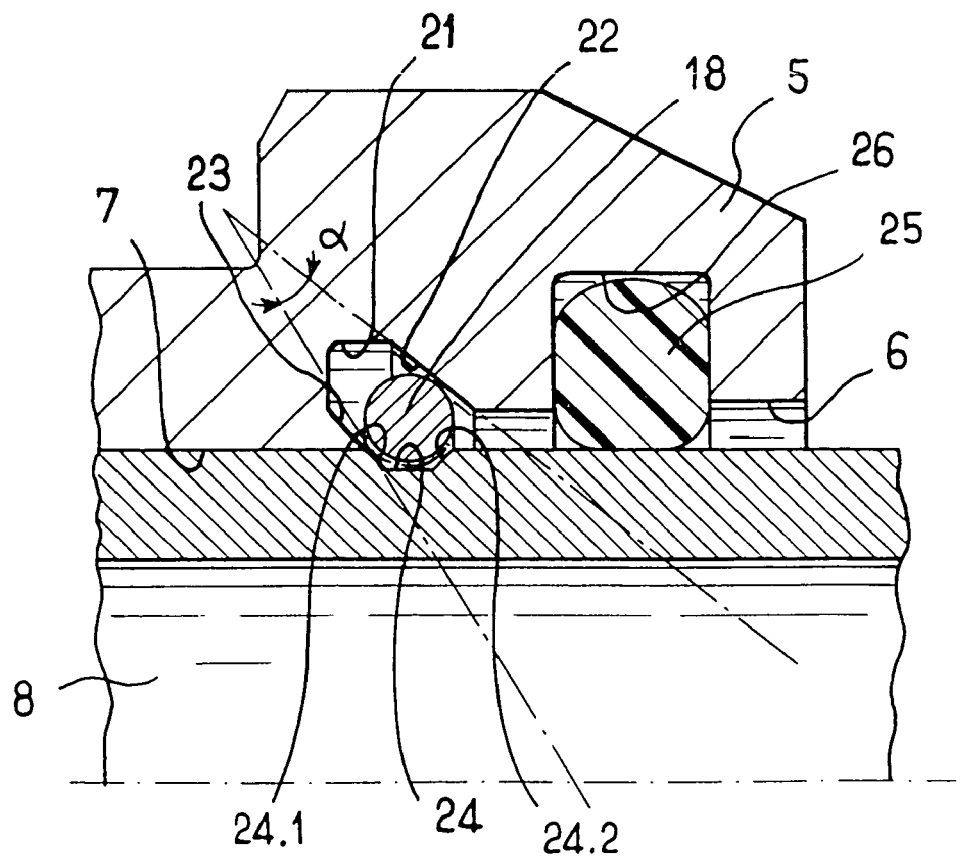
FIG_3

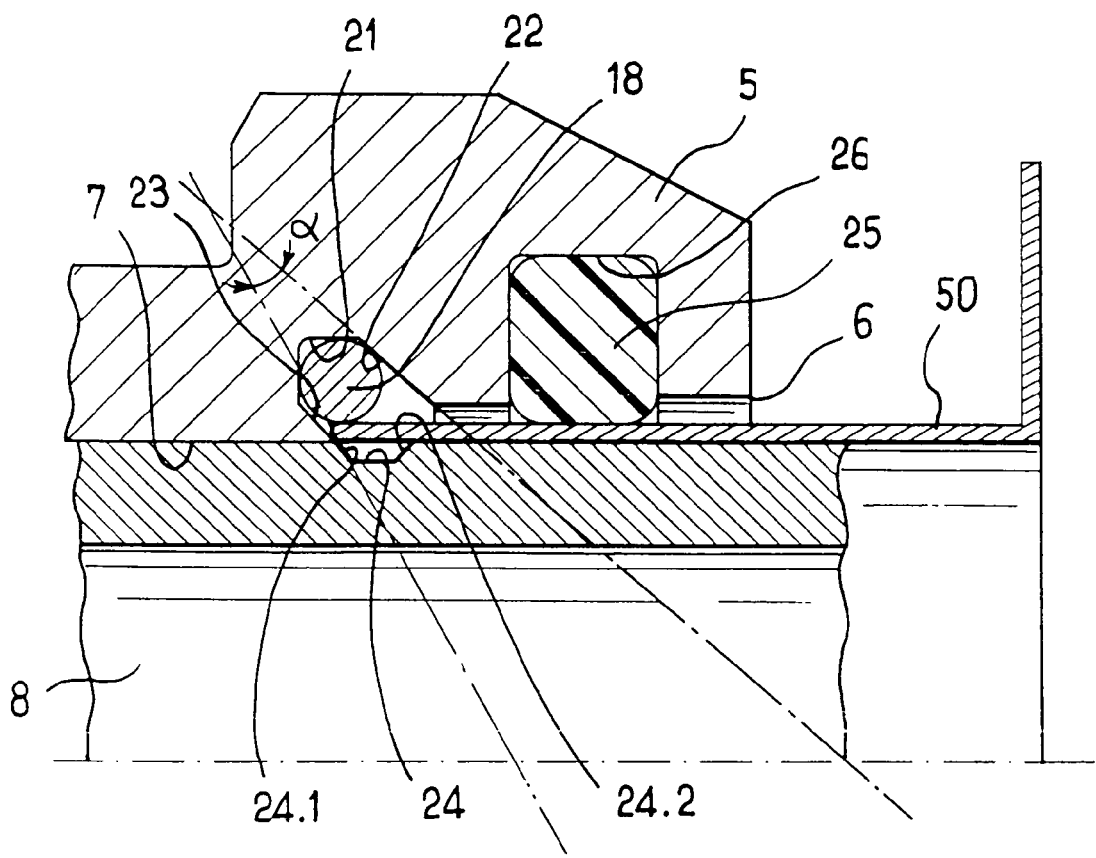
FIG_4
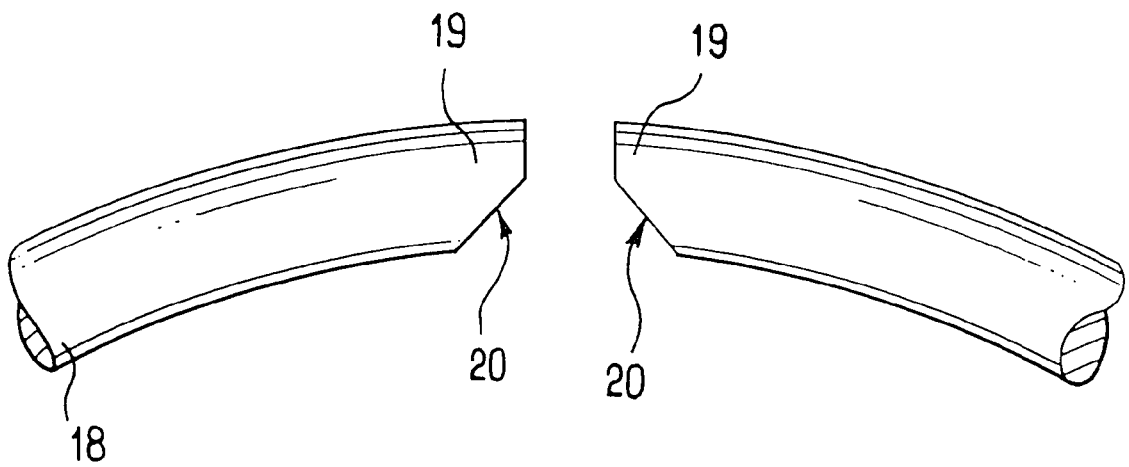
FIG_5

CONNECTION MEANS FOR HIGH PRESSURE FLUID DUCTS

CROSS REFERENCE TO RELATED APPLICATIONS

This application is the 35 USC 371 National Stage of International Application PCT/FR03/02598 filed on Aug. 28, 2003, which designated the United States of America.

FIELD OF THE INVENTION

The present invention relates to means for connecting ducts of circuit elements for conveying fluids, in particular at high pressures. These elements may be constituted by a pipe, a fluid emitter member such a pump, or a fluid receiver member such as a cylinder.

BACKGROUND OF THE INVENTION

Connection devices are known comprising a coupling which is designed to be mounted on a first fluid transport circuit element and which define an internal channel having a first end segment in communication with the duct of the circuit element and a second end segment, opposite therefrom, which is arranged to receive an endpiece secured to a second circuit element such as a pipe. The second end segment is provided with means for holding the endpiece thereto in leaktight manner, said means comprising an annular retaining element that is elastically deformable in the radial direction and that, at rest, possesses an inside diameter no greater than the outside diameter of the endpiece, and that it is received in a groove of the second endpiece. On its side adjacent to the opening for inserting the endpiece into the second end segment, the groove has a flank that is frustoconical, and on its opposite side it has a flank that is radial, with the flanks being spaced apart from each other in such a manner that the retaining element is axially movable between a position close to the radial flank in which it can be subjected to radial expansion in order to allow the endpiece to pass through while it is being inserted into the coupling, and a position close to the opening in which the frustoconical flank forms means for shrinking the retaining element onto the endpiece when an extraction force is exerted thereon.

That retention technique provides strength against pulling out that is large even when the pressure of the fluid flowing in the circuit is high. Nevertheless, when the circuit is initially put under pressure, the endpiece moves backwards until the retaining element comes into its position close to the opening. Successive variations in pressure tend to generate back-and-forth movements of the endpiece (pistoning) that encourage leaks or seepage to occur through the coupling. In addition, reversal of the endpiece presents the drawback of forming a zone in which fluid is retained between the terminal face of the endpiece and the internal shoulder of the coupling that forms the abutment against the endpiece being pushed into the coupling.

OBJECTS AND SUMMARY OF THE INVENTION

It would therefore be advantageous to have means suitable for restricting reverse movement of the endpiece relative to the coupling.

The invention provides connection means comprising a coupling defining an internal channel having an end segment possessing an insertion opening for insertion of an endpiece and provided with means for retaining the endpiece in leaktight manner therein, said means comprising an annular sealing element that is axially compressible and that is mounted in the coupling to have one face serving as a bearing surface for a terminal face of the endpiece, and an annularly-shaped retaining element that is elastically deformable in a radial direction and that is received in an inner groove of the end segment in order to have an inner circumferential portion projecting through an opening of the inner groove so as to be received in an outer groove of the endpiece, the inner groove having a concave frustoconical flank beside the opening of the end segment to form means for shrinking the retaining element, and a convex frustoconical flank on its side remote from the opening, which flank is spaced apart from the concave frustoconical flank by a distance such that the retaining element is received with clearance in the inner groove, and the terminal face of the endpiece and the outer groove thereof being spaced apart by a distance slightly greater than the distance between the face of the sealing element and the opening of the inner groove of the coupling.

Thus, while the endpiece is being inserted into the coupling, the endpiece pushes the annular retaining element against the convex frustoconical flank which tends to hold the retaining element close to the concave frustoconical flank, while still allowing the retaining element to expand elastically in the radial direction. Thus, as soon as the outer groove of the endpiece comes into register with the opening of the inner groove of the coupling, the retaining element returns into its rest state and its internal circumferential portion projects into the outer groove of the endpiece. Because the distance between the grooves is different from the distance between the face of the sealing element and the terminal face of the endpiece, the sealing element is compressed, and pushes against the endpiece in such a manner that the retaining element is clamped between the concave frustoconical flank of the inner groove of the coupling and the opposite flank of the outer groove of the endpiece. Reverse movement of the endpiece is thus restricted.

In a particular embodiment, the outer groove of the endpiece has a convex frustoconical flank beside a terminal face of the endpiece, said flank co-operating with the concave frustoconical flank of the inner groove of the coupling to form an angle that is open towards the insertion opening, which angle is preferably about 10°.

Particularly effective retention of the endpiece in the coupling is thus obtained. In particular, closure of the retaining element in the outer groove of the endpiece is encouraged by the facts that the outer groove of the endpiece has a convex frustoconical flank facing the concave frustoconical flank of the inner groove of the coupling, and the convex flank has an angle that is greater than that of the concave flank of the inner groove of the coupling.

According to a preferred characteristic, the retaining element is a split ring having chamfer-shaped ends on the inside of the split ring.

The risk of the split ring scratching the outer surface of the endpiece during insertion thereof into the coupling is thus limited.

Other characteristics and advantages of the invention appear on reading the following description of a particular and non-limiting embodiment of the invention.

BRIEF DESCRIPTION OF THE DRAWINGS

Reference is made to the accompanying drawings, in which:

FIG. 1 is a cutaway perspective view of connection means in accordance with the invention;

FIG. 2 is an enlarged view in longitudinal section of the zone referenced II in FIG. 1;

FIG. 3 is an enlarged view in longitudinal section of the zone referenced III in FIG. 1;

FIG. 4 is a view analogous to FIG. 3 showing the use of a disconnection tool with the disconnection means of the invention; and FIG. 5 is a view of the adjacent ends of the split ring used in the invention.

DETAILED DESCRIPTION OF THE INVENTION

The connection means in accordance with the invention that are described herein are for implanting in a hydraulic circuit to connect a pipe to an internal duct of a member in the circuit.

With reference to the figures, the connection means in accordance with the invention comprise a coupling given overall reference 1 comprising a tubular body 2 which defines an internal channel 3 and which has a first end 4, in this case a threaded end for screwing into tapping formed at the end of the internal duct in the member, and a second end 5 where the internal channel 3 opens out via an opening 6 through which an endpiece 8 is to be inserted into an end segment 7 of the internal channel 3.

The endpiece 8 is tubular in shape having an outside diameter that is slightly smaller than the inside diameter of the end segment 7. The endpiece 8 possesses an end counterbore 9 with an inside surface 28 that flares towards the front face of the endpiece from an end defined by a convex frustoconical surface forming a shoulder 10. Opposite from the end counterbore 9, the endpiece 8 possesses an end that is not visible in the figures and that is arranged for mounting on one end of the pipe.

The internal channel 3 of the body 2 is provided with means for retaining the endpiece 8 therein in leaktight manner.

The leaktight retaining means comprise an annular sealing element, given overall reference 11, that is received in a housing formed at the end of the end segment 7 of the internal channel 3.

The sealing element 11 has a ring 12 connecting it to the housing. The ring 12 possesses a radial face projecting axially from which there extends a terminal sleeve 13, and opposite from the terminal sleeve 13, it possesses an outwardly-chamfered annular portion 14 which is pressed against a surface of complementary shape in the housing.

The ring 12 includes means for clipping it into the housing. In this case, these means are formed by an annular bead 15 projecting radially outwards from the ring 12 into an annular cavity of the housing.

The outside diameter of the terminal sleeve 13 lies between the minimum inside diameter and the maximum outside diameter of the counterbore 9, and is of a length that is slightly longer than the length of the counterbore 9. The terminal sleeve 13 possesses an end face 16 that is concave and frustoconical in order to cooperate with the internal shoulder 10, and it is provided on the outside with grooves 17.

The radial face of the projecting ring 12 from which the terminal sleeve 13 extends has a plane groove 27 which surrounds the terminal sleeve 13 in order to receive the end of the endpiece 8.

By way of example, the sealing element 11 may be made of a thermoplastic elastomer of the polyurethane type (TPU) or an elastomer of the acrylonitrile butadiene type (NBR), possibly containing a fill of reinforcing fibers such as glass fibers.

The leaktight retaining means further comprise a split ring 18 having ends 19 that are provided with chamfers 20 on the inside of the split ring (see FIG. 5). The split ring is elastically deformable in a radial direction, and at rest it possesses an inside diameter that is no greater than the outside diameter of the endpiece 8.

The split ring 18 is received in a groove 21 of the end segment 7. Beside the opening 6, the groove 21 has a concave frustoconical flank 22, and on its side remote from the opening 6 it has a convex frustoconical flank 23. The flanks 22 and 23 of the groove 21 are spaced apart by a distance that is slightly greater than the diameter of the split ring 18 so as to be able to receive it with clearance and forming an angle of about 40° with the central axis of the end segment 7.

The split ring 18 is designed to be received in an outer groove 24 of the endpiece 8 in its inner circumferential portion, the inside diameter of the split ring 18 at rest thus being smaller than the outside diameter of the endpiece 8. The outer groove 24 is defined laterally by flanks 24.1 and 24.2, and at least the flank 24.1 that is situated beside the terminal face of the endpiece 8 and which is thus opposite from the opening, forms an angle of about 50° relative to the central axis of the endpiece 8.

The leaktight retaining means also comprise an O-ring 25 received in a groove 26 formed in the end segment close to the opening 6. The inside diameter of the O-ring 25 is slightly smaller than the outside diameter of the endpiece 8.

In order to connect the pipe fitted with the endpiece 8 to the member fitted with the coupling 1, the endpiece 8 is inserted into the end segment 7 of the internal channel 3 via the opening 6.

The endpiece 8 is inserted by force into the O-ring 25 and pushes the split ring 18 against the flank 23 of the groove 21. The flank 23 tends to open out the split ring 18, thus making it easier for the endpiece 8 to pass therethrough.

The terminal sleeve 13 of the sealing element 11 penetrates into the end counterbore 9 of the endpiece 8 until the end face 16 of the terminal sleeve 13 comes into abutment against the internal shoulder 10 of the endpiece 8, and the end face of the endpiece 8 presses against the ring 12. The split ring 18 is then received in the outer groove 24 of the endpiece 8, and the sealing element 12 tends to push the endpiece 8 back so that the flank of the outer groove 24 opposite from the opening 6 pushes the split ring 18 back against the flank 22 of the groove 21. It should be observed that the distance between the groove 24 and the terminal face of the endpiece 8 is slightly greater than the distance between the bottom of the plane groove 27 and the opening of the groove 21. As a result, a first distance between the terminal face of the endpiece 8 and the point of contact between the split ring 18 and the flank 24.1, and a second distance between the bottom of the plane groove 27 and the point of contact of the split ring 18 against the flank 22, differ by an amount such that-the ring 12 is axially compressed when the split ring 18 is received in the groove 24, thereby keeping the split ring 18 in contact with the flanks 24.1 and 22. The flank 22 then exerts a shrinking force on the split ring 18, which closes into the groove. The cooperation between said flank of the outer groove 14, the split ring 18, and the flank 22 opposes extraction of the endpiece 8 from the coupling 1. Thus, beside the terminal face of the endpiece 8, the convex frustoconical flank 24.1 of the outer groove 24 of the endpiece 8 co-operates with the concave frustoconical flank 22 of the inner groove 21 of the coupling 1 to form an angle $\alpha$ that is open by about 10° towards the insertion opening 6 (i.e. the apex of this angle $\alpha$ is situated beside the sealing element 11) which encourages closure or shrinkage of the split ring 18 into the outer groove 24 when an extraction force is exerted on the endpiece 8.

The fact that the terminal sleeve 13 is slightly compressed, as is the ring 12, increases the contact force between the end face 16 and the inner shoulder 10. In particular because of the corresponding frustoconical shapes of the end face 16 and of the inner shoulder 10, the risk of the end face 16 escaping from bearing against the inner shoulder 10 is small, and the outer surface of the terminal sleeve 13 is pressed against the inner surface of the end counterbore 9. Because of its shape and its dimensions, the inner surface 28 exerts a prestress force on the terminal sleeve 13 which is forced to bear against this surface. In addition, co-operation between the frustoconical shapes of the inner shoulder 10 and of the end face 16 associated with the compression force encourages the terminal sleeve 13 to be deformed into a barrel shape serving to press the inner sleeve 13 against the inside surface 28.

The end of the endpiece 8 is received in the plane groove 27. The plane groove 27 subdivides the radial face of the ring 12 into an inner annular portion (extended by the terminal sleeve 13), and an outer annular portion which receives the end of the endpiece 8, thus serving to hold the sealing element 11 in position. This plane groove 27 extends substantially in register with the bead 15 so that inserting the endpiece 8 into the plane groove 27 tends to support the ring 12, thereby opposing any escape of the bead 15 from the annular cavity of the housing.

When the circuit is put under pressure, the fluid tends to press the chamfered portion 14 against the adjacent surface of the housing and the terminal sleeve 13 against the inside surface 28, thereby reinforcing sealing.

It should be observed that the inclination of the flanks 24.1 and 22 also makes it possible to avoid these surfaces being subjected to peening.

In order to disconnect the endpiece 8 from the coupling 1, it is possible to use a tool 50 constituted by a bushing that is split longitudinally so as to enable it to be put into place laterally onto the endpiece 8. The bushing has one end arranged to be slid between the outside surface of the endpiece 8 and the inside surface of the portion of the end segment 7 that extends between the opening 6 and the flank 22, so as to be inserted into the split ring 18 and/or so as to push the split ring 18 back against the flank 23, while the opposite end of the bushing is provided on the outside with a collar enabling it to be pushed into the coupling.

Simultaneously with pushing in the tool 50, a traction force is applied to the endpiece 8.

Naturally, the invention is not limited to the embodiment described but also covers various embodiments coming within the ambit of the invention as defined by the claims.

In particular, the endpiece can be fitted onto the end of a pipe as in the embodiment described, or the endpiece may be formed by the end of a pipe that is arranged accordingly.

In a variant, the terminal face of the terminal sleeve 13 and the shoulder 10 of the end counterbore 9 can also be formed by radial annular faces. The terminal sleeve 13 may also be of a length that is shorter than that of the end counterbore 9 of the endpiece 8 so that the coupling is sealed only by contact between the outside surface of the terminal sleeve 13 and the inside surface of the end counterbore 9.

The sealing element may be of a configuration different from that described, for example it need not have a terminal sleeve 13. Furthermore, the endpiece 8 need not have an end counterbore 9 or could have an end counterbore 9 with an inside surface that is vertical or of any other circularly cylindrical shape.

The invention claimed is:

1. Connection means comprising a coupling defining an internal channel having an end segment possessing an insertion opening for insertion of an endpiece and means for retaining the endpiece therein in a leaktight manner, said means comprising an annular sealing element that is axially compressible and is mounted in the coupling to have one face serving as a bearing surface for a terminal face of the endpiece, and an annularly shaped retaining element that is elastically deformable in a radial direction and is received in an inner groove of the end segment in order to have an inner circumferential portion projecting through an opening of the inner groove so as to be received in an outer groove of the endpiece, the inner groove having a first frustoconical flank beside the opening of the end segment to form means for shrinking the retaining element, and a second frustoconical flank on a side remote from the opening facing the first frustoconcial flank, said second flank being spaced apart from the first frustoconical flank by a distance such that the retaining element is received with clearance in the inner groove, and the terminal face of the endpiece and the outer groove thereof being spaced apart by a distance slightly greater than the distance between the face of the sealing element and the opening of the inner groove of the coupling.

2. Connection means according to claim 1, wherein the outer groove of the endpiece has a frustoconical flank beside a terminal face of the endpiece, said flank cooperating with the first frustoconical flank of the inner groove of the coupling to form an angle that is open towards the insertion opening.

3. Connection means according to claim 2, wherein the angle is about 10°.

4. Connection means according to claim 1, wherein the retaining element is a split ring having chamfer-shaped ends on the inside of the split ring.

* * * * *